(12) United States Patent
Katayama et al.

(10) Patent No.: US 10,996,076 B2
(45) Date of Patent: May 4, 2021

(54) SENSOR DEVICE MANAGEMENT METHOD AND SENSOR DEVICE MANAGEMENT SYSTEM

(71) Applicant: Hitachi, Ltd., Tokyo (JP)

(72) Inventors: Rintaro Katayama, Tokyo (JP); Kenichi Mizugaki, Tokyo (JP); Ryosuke Fujiwara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 235 days.

(21) Appl. No.: 16/408,498

(22) Filed: May 10, 2019

(65) Prior Publication Data

US 2019/0368893 A1 Dec. 5, 2019

(30) Foreign Application Priority Data

Jun. 5, 2018 (JP) .............................. JP2018-107510

(51) Int. Cl.

| | |
|---|---|
| *G06F 15/00* | (2006.01) |
| *G01D 21/00* | (2006.01) |
| *G01D 9/00* | (2006.01) |
| *G01D 7/00* | (2006.01) |
| *G01D 1/04* | (2006.01) |
| *G01D 1/10* | (2006.01) |
| *G01D 9/04* | (2006.01) |
| *H04W 4/38* | (2018.01) |
| *H04L 29/08* | (2006.01) |

(52) U.S. Cl.
CPC ................ *G01D 1/10* (2013.01); *G01D 1/04* (2013.01); *G01D 9/04* (2013.01); *H04W 4/38* (2018.02); *G06F 15/00* (2013.01); *H04L 67/12* (2013.01)

(58) Field of Classification Search
CPC .. G01D 1/10; G01D 1/04; G01D 9/04; H04W 4/38
USPC ........................... 702/127, 130, 65, 104, 116
See application file for complete search history.

(56) References Cited

U.S. PATENT DOCUMENTS

| | | | | |
|---|---|---|---|---|
| 10,282,963 | B2 * | 5/2019 | Fahey | A61B 5/0006 |
| 2009/0322510 | A1 * | 12/2009 | Berger | G06Q 10/0833 |
| | | | | 340/539.1 |
| 2017/0013547 | A1 * | 1/2017 | Skaaksrud | H04L 41/12 |
| 2018/0336513 | A1 * | 11/2018 | Smith | G05B 19/406 |
| 2019/0365308 | A1 * | 12/2019 | Laing | G06F 9/542 |
| 2020/0360696 | A1 * | 11/2020 | Pikov | A61N 1/36139 |

FOREIGN PATENT DOCUMENTS

JP 2016-85602 A 5/2016

* cited by examiner

*Primary Examiner* — Ly D Pham
(74) *Attorney, Agent, or Firm* — Mattingly & Malur, PC

(57) ABSTRACT

A management server 103 holds a parameter of a sensor device 101 and change management information related to a change in the parameter, and transmits the changed parameter and the change management information to the sensor device. The sensor device 101 holds the parameter and the change management information transmitted from the management server, and transmits the change management information to the management server together with measurement data. The management server collates the received change management information and preliminarily-held change management information to determine the change in the parameter on the basis of a result of the collation.

11 Claims, 10 Drawing Sheets

FIG. 5

| PARAMETER VERSION NUMBER | | 2 | 1 |
|---|---|---|---|
| PARAMETER CHANGE SUCCESS/FAILURE | | NOT-YET | SUCCESS |
| PARAMETER ID (PARAMETER NAME) | 00 (MEASUREMENT TIME) | 01:00:00 | 01:00:00 |
| | 01 (MEASUREMENT DATA TRANSMISSION TIME) | 03:30:00 | 03:30:00 |
| | 02 (MEASUREMENT INTERVAL) | 24:00:00 | 24:00:00 |
| | 03 (MEASUREMENT PERIOD) | 00:00:30 | 00:00:05 |
| | 04 (MEASUREMENT START FREQUENCY) | 300 | 100 |
| | 05 (MEASUREMENT END FREQUENCY) | 400 | 500 |
| | 06 (THE NUMBER OF MEASUREMENT FREQUENCIES) | 10 | 10 |
| | 07 (DETERMINATION THRESHOLD VALUE) | 5 | 5 |
| | ⋮ | ⋮ | ⋮ |

| COMMAND CODE (CHANGE) | SENSOR DEVICE ID | PARAMETER VERSION NUMBER | PARAMETER ID (1) | PARAMETER VALUE (2) | PARAMETER ID (2) | PARAMETER VALUE (2) | ... | PARAMETER ID (n) | PARAMETER VALUE (n) |

| PARAMETER VERSION NUMBER | | 2 |
|---|---|---|
| PARAMETER ID (PARAMETER NAME) | 00 (MEASUREMENT TIME) | 01:00:00 |
| | 01 (MEASUREMENT DATA TRANSMISSION TIME) | 03:30:00 |
| | 02 (MEASUREMENT INTERVAL) | 24:00:00 |
| | 03 (MEASUREMENT PERIOD) | 00:00:30 |
| | 04 (MEASUREMENT START FREQUENCY) | 300 |
| | 05 (MEASUREMENT END FREQUENCY) | 400 |
| | 06 (THE NUMBER OF MEASUREMENT POINTS ON FREQUENCY) | 10 |
| | 07 (DETERMINATION THRESHOLD VALUE) | 5 |
| | ⋮ | ⋮ |

| SENSOR DEVICE ID | | 5 |
|---|---|---|
| PARAMETER ID (PARAMETER NAME) | 00 (MEASUREMENT TIME) | 01:00:00 |
| | 01 (MEASUREMENT DATA TRANSMISSION TIME) | 03:30:00 |
| | 02 (MEASUREMENT INTERVAL) | 12:00:00 |
| | 03 (MEASUREMENT PERIOD) | 00:00:30 |
| | 04 (MEASUREMENT START FREQUENCY) | 300 |
| | 05 (MEASUREMENT END FREQUENCY) | 400 |
| | 06 (THE NUMBER OF MEASUREMENT POINTS ON FREQUENCY) | 10 |
| | 07 (DETERMINATION THRESHOLD VALUE) | 3 |
| | ⋮ | ⋮ |
| MEASUREMENT DATA | | 0x102a |

SENSOR DEVICE MANAGEMENT METHOD AND SENSOR DEVICE MANAGEMENT SYSTEM

TECHNICAL FIELD

The present invention relates to a sensor device management method and a sensor device management system, and particularly to change management of a parameter set for a sensor device.

BACKGROUND ART

A study on practical use of IoT (Internet of Things) in which a plurality of sensor devices is installed in facilities such as infrastructures to collect measurement data of the sensor devices through a wireless network has been advanced.

Various parameters are set for the sensor devices. For example, a measurement timing or frequency, a degree of measurement accuracy, a determination threshold value, a frequency band of vibrations to be measured, a measurement data transmission timing to a wireless network, and the like are set. In general, the sensor devices in a state where various parameters are set are installed in target locations.

There is a case in which after the sensor devices are installed, the parameters thereof are changed. For example, there is a case in which for the sensor devices that issue an alarm when measured vibrations exceed a fixed threshold value, the threshold value is increased to suppress the alarm, a case in which a measurement time for temperature is changed in accordance with a change in operating time of target devices attached to the sensor devices, or a case in which the measurement frequency is increased higher than the normal state, the granularity of a measurement target is finely defined, or a specific frequency band is measured when the sensor devices detect vibrations above a fixed level.

Regarding a change in the parameters of sensors, for example, Patent Literature 1 discloses that a processing server changes the sensor parameters of a first sensor and a second sensor by using integrated data obtained by integrating a first status map obtained by the first sensor measuring the position of an object and a second status map obtained by a second sensor measuring the position of an object.

CITATION LIST

Patent Literature

Patent Literature 1: Japanese Unexamined Patent Application Publication No. 2016-85602

SUMMARY OF INVENTION

Technical Problem

In order to change the parameters of the sensor devices during an operation of a system, it is only necessary to issue a parameter change instruction to the sensor devices from a management server that is connected to the sensor devices through a wireless network. However, there is a possibility of the drop of a parameter change instruction packet transmitted from the management server in the wireless network. In this case, the sensor devices cannot receive the parameter change instruction packet, and the parameter change instruction fails.

Further, in order for an application server to analyze measurement data collected from the sensor devices, not only the measurement data but also the parameters used by the sensor devices are needed. Therefore, the management server provides the application server with the parameters used by the sensor devices together with the measurement data. As a result, when the parameters of the sensor devices are changed, the management server needs to recognize whether the parameters used by the sensor devices in the measurement and the creation of the measurement data are those before or after change. Namely, the management server needs to recognize whether or not the parameter change has succeeded. In addition, it is also important for the management server to recognize a success/failure of the parameter change from the viewpoint of managing the sensor devices.

As an example of a method of recognizing whether or not the parameter change instruction for the sensor devices has succeeded, there is a method of using ACK (Acknowledgement) in a wireless network. In the method, the sensor device returns an ACK response for the parameter change instruction packet transmitted from the management server, and the management server determines that the parameter change instruction has succeeded on reception of ACK. However, in the case where the drop of ACK occurs in a wireless network in spite of a return of the ACK response after reception of the parameter change instruction packet by the sensor device, the sensor device changes the parameter, but the management server wrongly determines that the parameter change instruction has failed, namely, the parameter before change has still been set for the sensor device.

As another example of recognizing a success/failure of the parameter change, there is a method in which the parameters set for the sensor devices are added to measurement data transmitted from the sensor devices to the management server. In the method, the management server can simultaneously obtain the parameters set for the sensor devices and the measurement data, and thus the management server can reliably recognize whether the parameters used by the sensor devices are those before or after change. However, the size of the measurement data packet becomes large in the method, and thus there is a risk that the wireless band becomes tight and the power consumption of the sensor devices is increased.

As described above, in the parameter change of the sensor devices, the management server is required to reliably recognize a success/failure of the parameter change while suppressing an increase in the size of the measurement data packet. It should be noted that Patent Literature 1 does not mention a method of recognizing a success/failure of the parameter change.

An object of the present invention is to reliably recognize a success/failure of a parameter change to a sensor device.

Solution to Problem

According to a preferred example, a sensor device management method according to the present invention is configured as a sensor device management method in which measurement data measured by a sensor device is obtained and managed by a management server, comprising:

holding a parameter of the sensor device and change management information related to a change in the parameter in the management server, and transmits the changed parameter and the change management information to the sensor device, holding the parameter and the change management information transmitted from the management server in the sensor device, and transmits the change management information to the management server together with the measurement data, and collating in the management server the received change management information and preliminarily-held change management information to determine the change in the parameter on the basis of a result of the collation.

Further, according to a preferred example, a sensor device management system according to the present invention is configured as a sensor device management system in which a management server obtains and manages measurement data measured by a sensor device, comprising:

the management server including:

a first storage unit that holds a parameter of the sensor device and change management information related to a change in the parameter; and an interface that transmits the changed parameter and the change management information to the sensor device, the sensor device including:

a sensor;

a second storage unit that holds the parameter and the change management information transmitted from the management server; and a communication unit that transmits a packet including measurement data including data measured by the sensor and the change management information to the management server, and wherein the management server further includes a determination unit that collates the received change management information and preliminarily-held change management information to determine the change in the parameter on the basis of a result of the collation.

Advantageous Effects of Invention

According to the present invention, it is possible to reliably recognize a success/failure of a parameter change to a sensor device.

BRIEF DESCRIPTION OF DRAWINGS

FIG. 5 is a diagram for showing a configuration example of a parameter management table of the example.

FIG. 6 is a diagram for showing a configuration example of a parameter change instruction packet of the example.

FIG. 7 is a diagram for showing a configuration example of a parameter holding table of the example.

DESCRIPTION OF EMBODIMENTS

Hereinafter, an embodiment of the present invention will be described in detail on the basis of the drawings.

Figure 1:
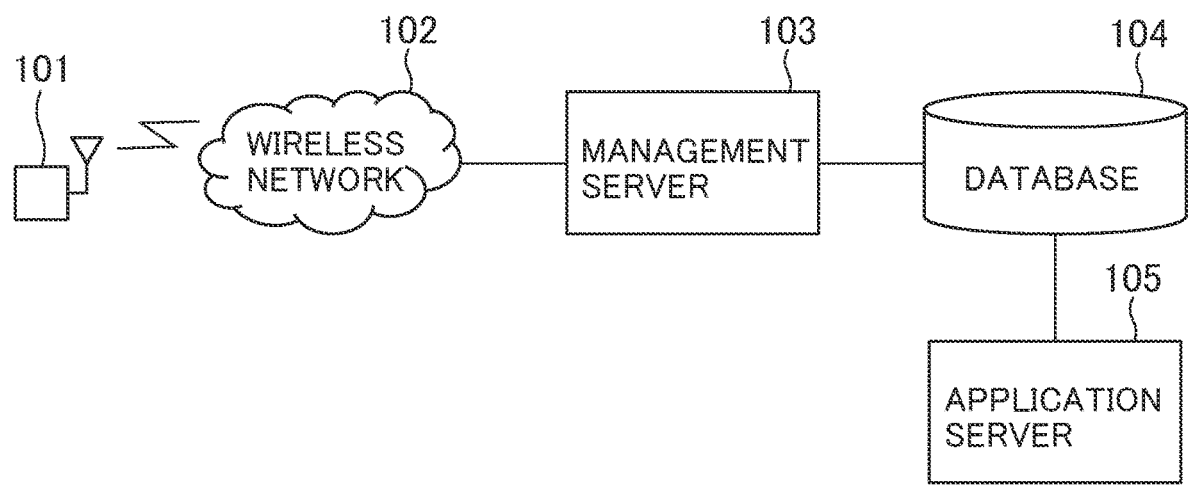
FIG. 1 is a diagram for showing a configuration of a sensor device management system according to one example.

FIG. 1 is a diagram for showing a configuration of a sensor device management system according to one example.

The sensor device management system is configured to include a plurality of sensor devices 101, a wireless network 102, a management server 103, a database 104, and an application server 105. The sensor device 101 is connected to the management server 103 through the wireless network 102. The wireless network 102 is usually configured using a wireless base station, a network server, and the like.

The sensor device 101 measures a temperature, humidity, a vibration, and the like, and transmits the measurement data or information created on the basis of the measurement data to the management server 103 through the wireless network 102 as a measurement data packet. The management server 103 creates a measurement data set on the basis of the received measurement data packet and a measurement parameter, and stores the same into the database 104. The database 104 is a computer installed on a network, and accumulates management information related to the sensor device 101 and the measurement data set. The application server 105 obtains the management information related to the sensor device 101 and the measurement data set from the database 104, and analyzes or displays the same.

Figure 2:
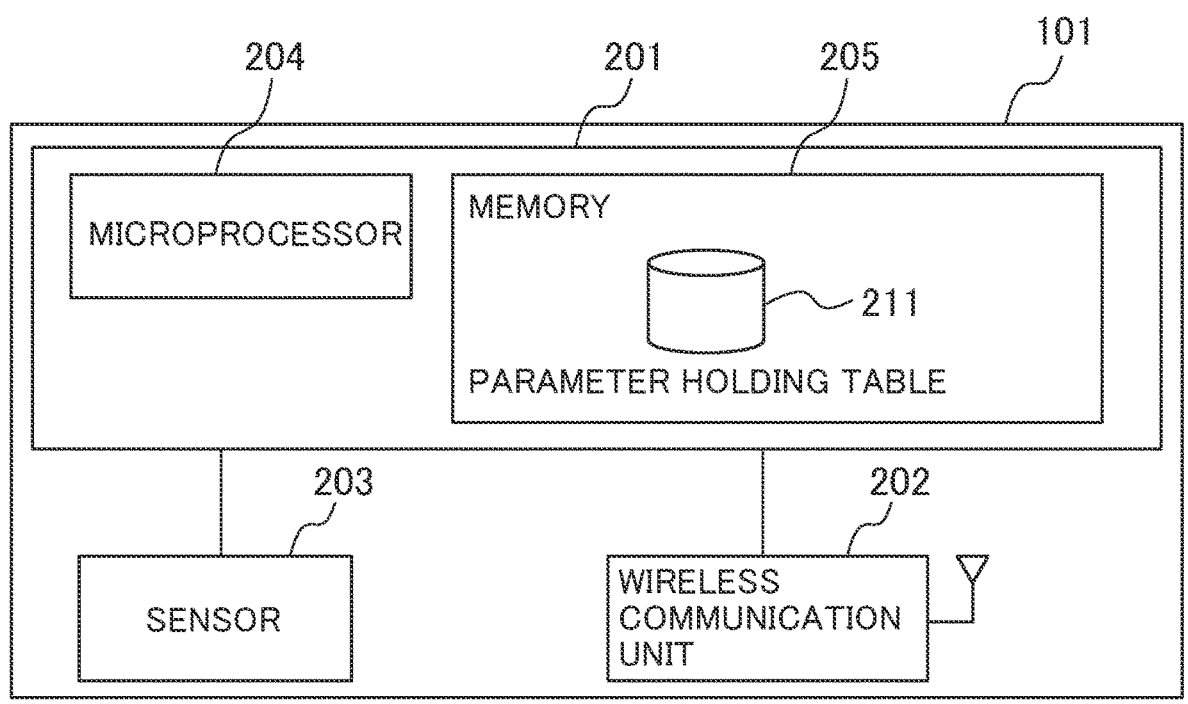
FIG. 2 is a diagram for showing a configuration of a sensor device of the example.

FIG. 2 is a diagram for showing a configuration of the sensor device 101.

The sensor device 101 is configured to have a control unit 201, a wireless communication unit 202, and a sensor 203. It should be noted that a power supply (battery) is not illustrated.

The control unit 201 has a microprocessor 204 and a memory 205. By executing a program, the microprocessor 204 controls the measurement of the sensor 203, generates measurement data on the basis of a measurement result by the sensor 203, instructs to transmit the measurement data packet to the wireless communication unit 202, and processes data received from the wireless communication unit 202. The memory 205 stores a parameter holding table 211. A configuration of the table will be described later with reference to FIG. 7. The wireless communication unit 202 wirelessly transmits or receives data to/from the wireless network 102. The sensor 203 is a detector that measures physical changes in temperatures, humidity, vibrations, and the like.

Figure 3:
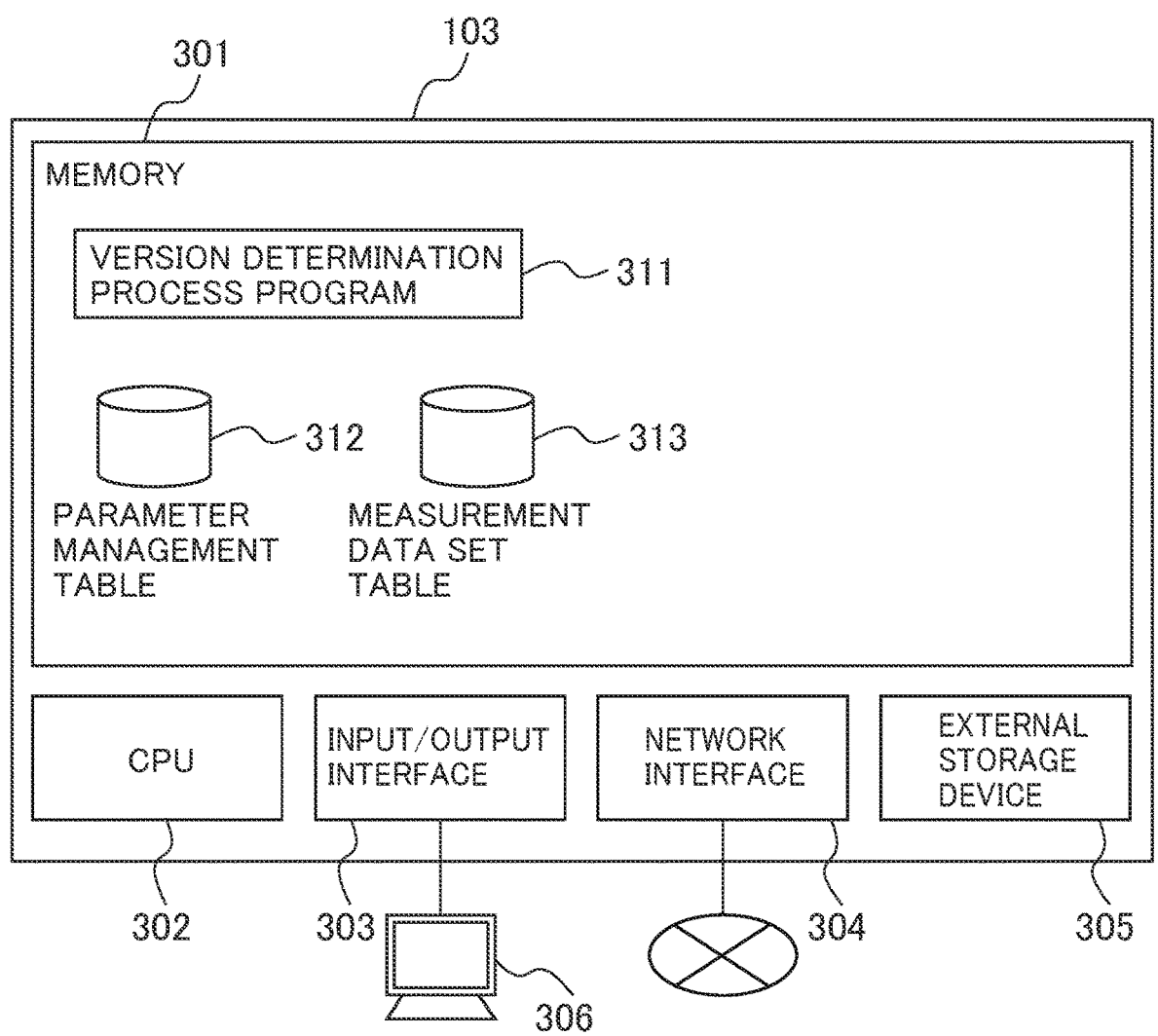
FIG. 3 is a diagram for showing a configuration of a management server of the example.

FIG. 3 is a diagram for showing a configuration of the management server 103.

The management server 103 is configured to have a memory 301, a processor (CPU) 302, an input/output interface 303 connected to an input/output device 306, a network interface 304, and an external storage device 305. Each function of the management server 103 is realized in such a manner that program software stored in the external storage device 305 is expanded to the memory 301 to be executed by the CPU 302. The management server 103 allows the network interface 304 to communicate with the sensor device 101 through the wireless network 102. In addition, the management server 103 is connected to the database 104 through the network interface 304.

The memory 301 stores aversion determination process program 311, a parameter management table 312, and a measurement data set table 313. The processing operations of these programs and the configuration of each table will be described later.

Figure 4:
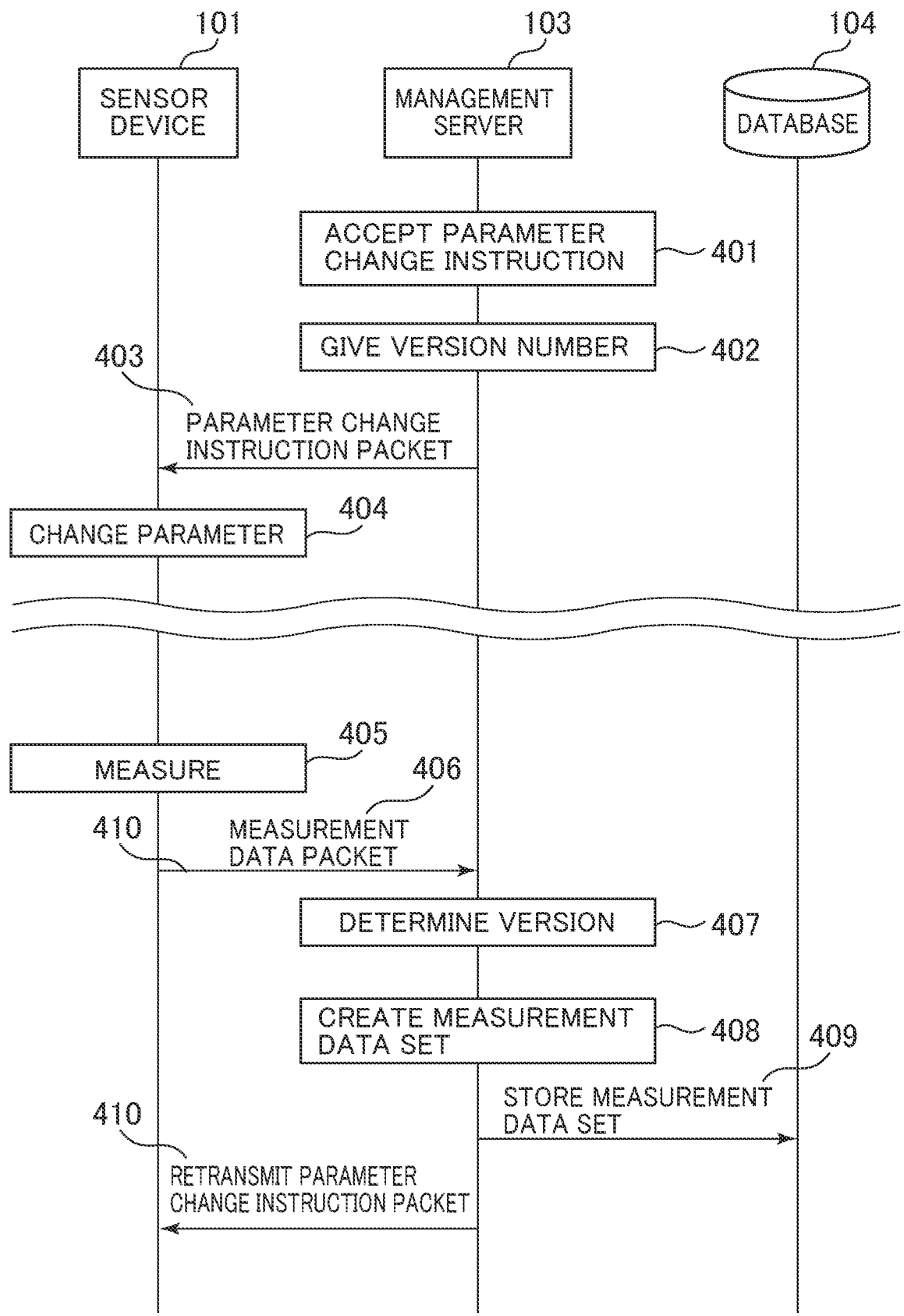
FIG. 4 is a diagram for showing an operation sequence in a parameter change of the sensor device and creation of a measurement data set of the example.

Next, operations when the parameter of the sensor device is changed and the measurement data set is created will be described with reference to FIG. 4. FIG. 4 is a sequence diagram for explaining procedures for the parameter change of the sensor device and the creation of the measurement data set.

First, the management server 103 accepts a parameter change instruction input from the input/output device 306 through the input/output interface 303 (401). The parameter change includes at least any one of a parameter name and a parameter ID, and a value after the change. The parameter change may be performed for a single parameter or a plurality of parameters at the same time. It should be noted that the parameter change instruction may be input from not the input/output device 306 but the application server 105. In this case, the management server 103 is configured so as to be connected to the application server 105 through the network interface 304, and the network interface 304 of the management server 103 accepts the parameter change instruction input from the application server 105.

After accepting the parameter change instruction, the CPU 302 of the management server 103 gives a version number (402).

Here, an example of giving the version number will be described using FIG. 5. FIG. 5 shows the parameter management table 312 created and updated in a version number giving process. The parameter management table 312 is prepared for each sensor device, and is configured to include a parameter version number, a flag indicating a parameter change success/failure, and a parameter set of parameter IDs (parameter names) for identifying parameters. The parameter IDs include, for example, a measurement time, a measurement data transmission time, a measurement interval, a measurement period, a measurement start frequency, a measurement end frequency, a determination threshold value, and the like.

In the example of FIG. 5, it is assumed that the sensor device 101 has already used a parameter set identified with a parameter version number "1". In addition, it is assumed that the management server 103 has accepted an instruction of changing the measurement period, the measurement start frequency, and the measurement end frequency in Step 401.

The parameter version number is a version number for a parameter set that is given to the parameter set configured using the value of each parameter by the CPU 302. In the example, it is assumed that the CPU 302 increments the parameter version number by 1 every time a parameter change is performed. Accordingly, an old or new parameter set can be easily determined on the basis of the magnitude of the parameter version number.

In FIG. 5, the CPU 302 gives a parameter version number "2" as a result of accepting the parameter change instruction. The parameter set corresponding to the parameter version number "2" includes the new values of the parameters (the measurement period, the measurement start frequency, and the measurement end frequency) having accepted the change and the existing values of the other parameters. The existing values mean the corresponding values in the parameter set having the newest parameter version number among the parameter sets whose parameter change success/failure flags indicate "success", and correspond to those already used by the sensor device 101. In FIG. 5, the parameter values of the parameter version number "1" are the existing values.

In FIG. 5, the parameter set having the parameter version number "1" is already used by the sensor device, and thus the parameter change success/failure flag indicates "success". The parameter change success/failure flag of the parameter set having the parameter version number "2" indicates "not-yet" because the parameter change instruction has not been issued to the sensor device yet.

With reference to FIG. 4 again, after the CPU 302 of the management server 103 gives the version number, a parameter change instruction packet is transmitted to the sensor device 101 (403).

Here, a configuration of the parameter change instruction packet will be described with reference to FIG. 6. The parameter change instruction packet 601 is configured to include "change" indicated by a command code, a sensor device ID that is the identifier of the sensor device 101, a parameter version number, and the parameter ID and value of each parameter. It should be noted that there are "diagnosis", "stop", and the like other than "change" as the command codes.

The parameter version number included in the parameter change instruction packet is a number ("2" in the example of FIG. 5) assigned by the CPU 302 in Step 402, and the parameter value included in the parameter change instruction packet is a parameter value corresponding to the parameter version number.

The parameter change instruction packet 601 may include the parameter IDs and values of all the parameters, but may include only the parameter ID and value of the parameter having accepted the change in Step 401. In the case where only the parameter ID and value of the parameter having accepted the change in Step 401 is included in the parameter change instruction packet, the size of the parameter change instruction packet can be reduced as compared to the case in which the parameter IDs and values of all the parameters are included, and it is possible to suppress a wireless communication band to be used and wireless communication time.

With reference to FIG. 4 again, when the sensor device 101 receives the parameter change instruction packet 601, the control unit 201 of the sensor device 101 updates the parameter holding table 211 to change the parameter (404).

Here, the update of the parameter holding table 211 performed by the control unit 201 of the sensor device will be described using FIG. 7. The parameter holding table 211 holds a parameter value used by the sensor device 101, and specifically stores a parameter version number and the ID and value of each parameter.

When receiving the parameter change instruction packet 601, the control unit 201 updates the parameter version number and the parameter value of the parameter holding table 211 in accordance with the content of the parameter change instruction packet. In the case of the parameter that is not included in the parameter change instruction packet, the control unit 201 keeps the value before the parameter change instruction packet is received.

With reference to FIG. 4 again, the sensor 203 of the sensor device 101 measures a temperature, humidity, a vibration, and the like at timing such a predetermined time designated by the above-described parameter (405). Then, the control unit 201 transmits the measurement result and information (measurement data) created on the basis of the measurement result as the measurement data packet to the management server 103 through the wireless network 102 at the predetermined timing designated by the above-described parameter (406).

Figure 8:
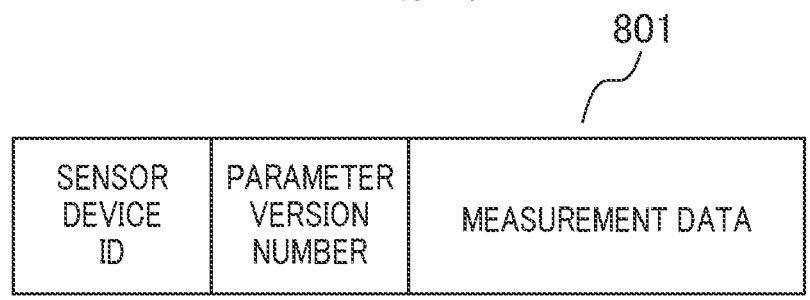
FIG. 8 is a diagram for showing a configuration example of a measurement data packet of the example.

Here, the measurement data packet will be described using FIG. 8.

A measurement data packet 801 is configured to include a sensor device ID, a parameter version number, and measurement data. The parameter version number of the parameter holding table 211 is reflected in the parameter version number. It should be noted that the sensor device ID, the parameter version number, and the measurement data are desirably transmitted by a single packet as in the example of FIG. 8, but may be transmitted by a plurality of divided packets.

As described above, in the case where the measurement data packet 801 includes the parameter version number, the packet size can be reduced as compared to the case in which the measurement data packet includes a parameter set, and it is possible to suppress power consumption of the sensor device and use of the wireless band.

With reference to FIG. 4 again, the management server 103 having received the measurement data packet determines the version (407).

Here, a version determination process performed by the CPU 302 of the management server 103 will be described using FIG. 9. The version determination process is performed in such a manner that the CPU 302 executes the version determination process program 311 stored in the memory 301.

That is, the CPU 302 refers to the parameter management table 312 to determine whether or not the parameter version number in the received measurement data packet 801 is the latest number (901). The latest parameter version number is the latest parameter version number in the parameter management table 312.

In the case where the result of the determination shows that the parameter version number in the measurement data packet is the latest number (901: Yes), the CPU 302 determines whether or not the parameter change success/failure flag corresponding to the latest parameter version number of the parameter management table 312 indicates "not-yet" (902).

In the case where the parameter change success/failure flag corresponding to the latest parameter version number indicates "not-yet" (902: Yes), the CPU 302 determines that the parameter change has succeeded, and rewrites the parameter change success/failure flag corresponding to the latest parameter version number of the parameter management table 312 with "success". On the other hand, in the case where the parameter change success/failure flag corresponding to the latest parameter version number does not indicate "not-yet" (902:No), the CPU 302 terminates the version determination process because the parameter change is not being carried out.

In the case where the parameter version number in the measurement data packet is not the latest number in the determination 901 (901: No), the CPU 302 rewrites the parameter change success/failure flag corresponding to the latest parameter version number of the parameter management table 312 with "failure".

As described above, the management server 103 can determine the parameter change success/failure by referring to the parameter version number in the measurement data packet 801 and the parameter management table 312.

It should be noted that when the sensor device 101 receives the parameter change instruction (403), an ACK response may be returned to the management server 103. Then, it is determined that the parameter change has succeeded at the time when the CPU 302 received the ACK response, and the parameter change success/failure of the parameter management table can be rewritten into "success". However, if the parameter change success/failure is determined only with the ACK response, the management server 103 cannot correctly recognize the parameter change success/failure in the case where the sensor device 101 returns the ACK response but the management server 103 cannot receive the ACK.

Figure 9:
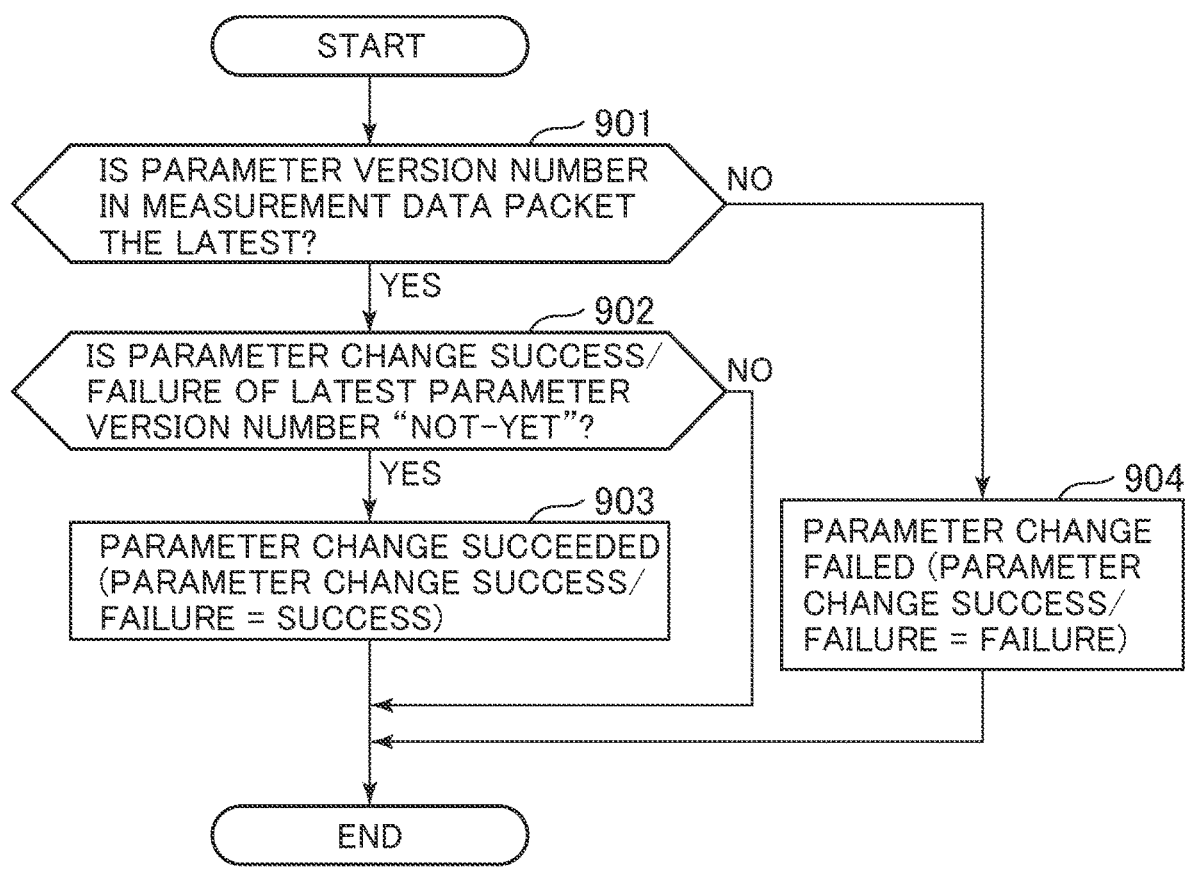
FIG. 9 shows a flowchart of a version determination process of one example.

On the contrary, the management server 103 can reliably recognize the parameter change success/failure by using the parameter version number in the measurement data packet as an operation of FIG. 9. The operation is especially effective in the case where communication quality differs between the uplink directing from the sensor device towards the management server and the downlink directing from the management server towards the sensor device due to a difference in performance of a receiver.

In FIG. 4 again, after the determination of the version number, the CPU 302 of the management server 103 adds a parameter to the measurement data to create a measurement data set (408).

Figure 10:
FIG. 10 is a diagram for showing a configuration example of a measurement data set of one example.

Here, the measurement data set will be described using FIG. 10. FIG. 10 shows an example of the measurement data set table 313 created in Step 408. The measurement data set table 313 is configured to include a sensor device ID, a parameter value, and measurement data. The sensor device ID and the measurement data are obtained from the measurement data packet. As the parameter value, the parameter value corresponding to the parameter version number included in the measurement data packet is obtained from the parameter management table 312.

Accordingly, the management server 103 can reliably provide the parameter set used by the sensor device together with the measurement data.

With reference to FIG. 4 again, in the case where the CPU 302 determines that the parameter change has failed in the determination step 407, the CPU 302 does not need to create the measurement data set. In this case, the CPU 302 discards the measurement data packet.

Thereafter, the CPU 302 stores the measurement data set into the database 104 (409). The application server 105 can obtain a target measurement data set from the database 104 to provide various services.

In the case where the CPU 302 determines that the parameter change has failed in the determination step 407, the CPU 302 resends the parameter change instruction packet to the sensor device 101 (410), and instructs to change the parameter again.

It should be noted that in the case where it is determined that the parameter change has failed, the CPU 302 does not need to resent the parameter change instruction packet. In this case, an error response is desirably returned for the parameter change accepted from the input/output device 306.

The preferred example has been described above. However, the present invention is not limited to above-described example, and can be carried out by being variously modified and applied.

For example, the parameter change success/failure for the sensor device is recognized by determining the consistency of the version number of the parameter set in the above-described example. According to an alternative example, it is possible to determine the consistency of the parameter set on the basis of change management information related to a change in the parameter set such as the update year, month, and date, the update year and month, or the update year of the parameter set instead of the version number of the parameter set.

Further, in the above-described example, the measurement data packet is transmitted to the management server 103 at the timing such as the predetermined time designated by the parameter (Step 406) in the operation explanation with reference to FIG. 4. According to an alternative example, the measurement data packet is not transmitted at the timing such as the preliminarily-designated predetermined time (namely, the normal measurement timing), but the sensor device 101 may allow the sensor 203 to conduct the measurement within a predetermined period of time after receiving the parameter change instruction packet (Step 403), and may transmit the measurement result to the management server. In this case, the power consumption of the sensor device is increased because the measurement data packet is transmitted to the management server at the timing different from the normal measurement timing. On the other hand, the management server can early determine the result of the parameter change instruction.

LIST OF REFERENCE SIGNS

101: sensor device
102: wireless network
103: management server
104: database
105: application server
312: parameter management table
601: parameter change instruction packet
211: parameter holding table
801: measurement data packet
313: measurement data set

The invention claimed is:

1. A sensor device management method in which measurement data measured by a sensor device is obtained and managed by a management server, comprising:
holding a parameter of the sensor device and change management information related to a change in the parameter in the management server, and transmitting the changed parameter and the change management information to the sensor device,
holding the parameter and the change management information transmitted from the management server in the sensor device, and transmitting the change management information to the management server together with the measurement data, and
collating in the management server the received change management information and preliminarily-held change management information to determine the change in the parameter on the basis of a result of the collation.

2. The sensor device management method according to claim 1,
wherein the management server associates a first parameter set including a plurality of parameters with first change management information associated with the first parameter set to be stored into a first storage unit,
wherein the management server generates second change management information different from the first change management information when one or a plurality of parameters in the first parameter set is changed,
at least the one or plurality of changed parameters and the second change management information are transmitted to the sensor device, and
wherein the sensor device associates the one or plurality of received and changed parameters with the second change management information to be held in a second storage unit.

3. The sensor device management method according to claim 2,
wherein the management server stores into the first storage unit a parameter management table in which the parameter set including a plurality of parameters, a unique parameter ID given while being associated with each of the parameters, and the change management information are registered while being associated with each other for each sensor device,
wherein the management server transmits at least the one or plurality of changed parameters, the parameter ID associated with the parameter, and the second change management information to the sensor device, and
wherein the sensor device stores into the second storage unit a parameter holding table in which the one or plurality of received and changed parameters, the parameter ID, and the second change management information are registered while being associated with each other.

4. The sensor device management method according to claim 1,
wherein the sensor device has a unique sensor device ID, and
the sensor device transmits to the management server a measurement data set including the measurement data, the change management information, and the sensor device ID.

5. The sensor device management method according to claim 1,
wherein the sensor device transmits the measurement data to the management server at predetermined timing designated by the parameter.

6. The sensor device management method according to claim 1,
wherein the management server stores the measurement data set into a database in the case where it is determined that the change in the parameter has succeeded in the determination, and
the management server resends the changed parameter and the change management information to the sensor device in the case where it is determined that the change in the parameter has failed in the determination.

7. The sensor device management method according to claim 3,
wherein the parameter management table holds a flag indicating a success/failure of the change in the parameter, and
wherein management server determines that the change in the parameter has succeeded when the flag indicates "not-yet" of the change in the parameter in the case where it is determined that the change management information transmitted from the sensor device is the latest information by referring to the parameter management table.

8. The sensor device management method according to claim 1,
wherein the change management information is a parameter version number given every time the parameter is updated.

9. The sensor device management method according to claim 1,
wherein the parameter includes any one of a measurement time, a measurement data transmission time, a measurement interval, a measurement period, a measurement start frequency, a measurement end frequency, and a determination threshold value in the sensor device.

10. A sensor device management system in which a management server obtains and manages measurement data measured by a sensor device, comprising:
the management server including:
a first storage unit that holds a parameter of the sensor device and change management information related to a change in the parameter; and an interface that transmits the changed parameter and the change management information to the sensor device, the sensor device including:

a sensor;

a second storage unit that holds the parameter and the change management information transmitted from the management server; and a communication unit that transmits a packet including measurement data including data measured by the sensor and the change management information to the management server, and wherein the management server further includes a determination unit that collates the received change management information and preliminarily-held change management information to determine the change in the parameter on the basis of a result of the collation.

11. The sensor device management system according to claim 10, wherein the first storage unit of the management server stores a parameter management table in which the parameter set including a plurality of parameters, a unique parameter ID given while being associated with each of the parameters, and the change management information are registered while being associated with each other for each sensor device, wherein the interface of the management server transmits at least one or plurality of changed parameters, the parameter ID associated with the parameter, and changed change management information to the sensor device, and wherein the second storage unit of the sensor device stores a parameter holding table in which the one or plurality of changed parameters, the parameter ID, and the changed change management information transmitted from the management server are registered while being associated with each other.

* * * * *